Jan. 3, 1939. J. M. TRINER 2,142,424
SCALE
Filed Feb. 25, 1937 3 Sheets-Sheet 2
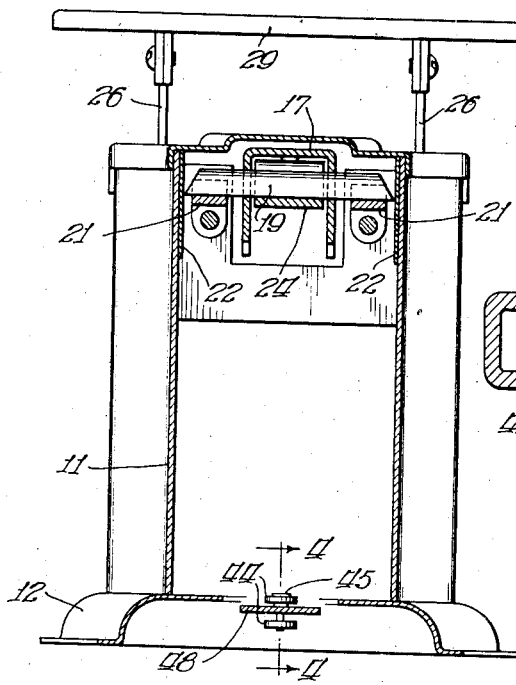
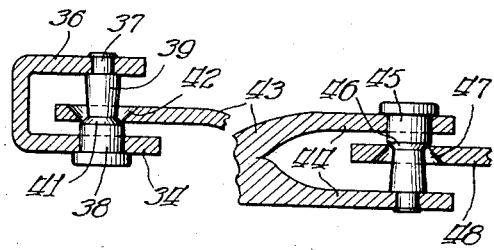
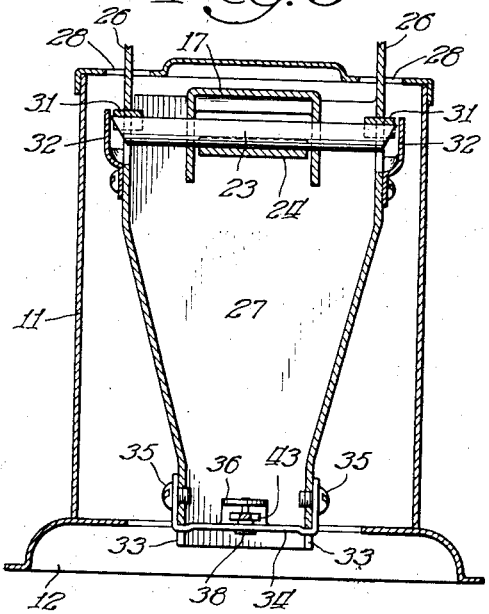
Inventor:
James M. Triner
By Walter M. Fuller Atty.

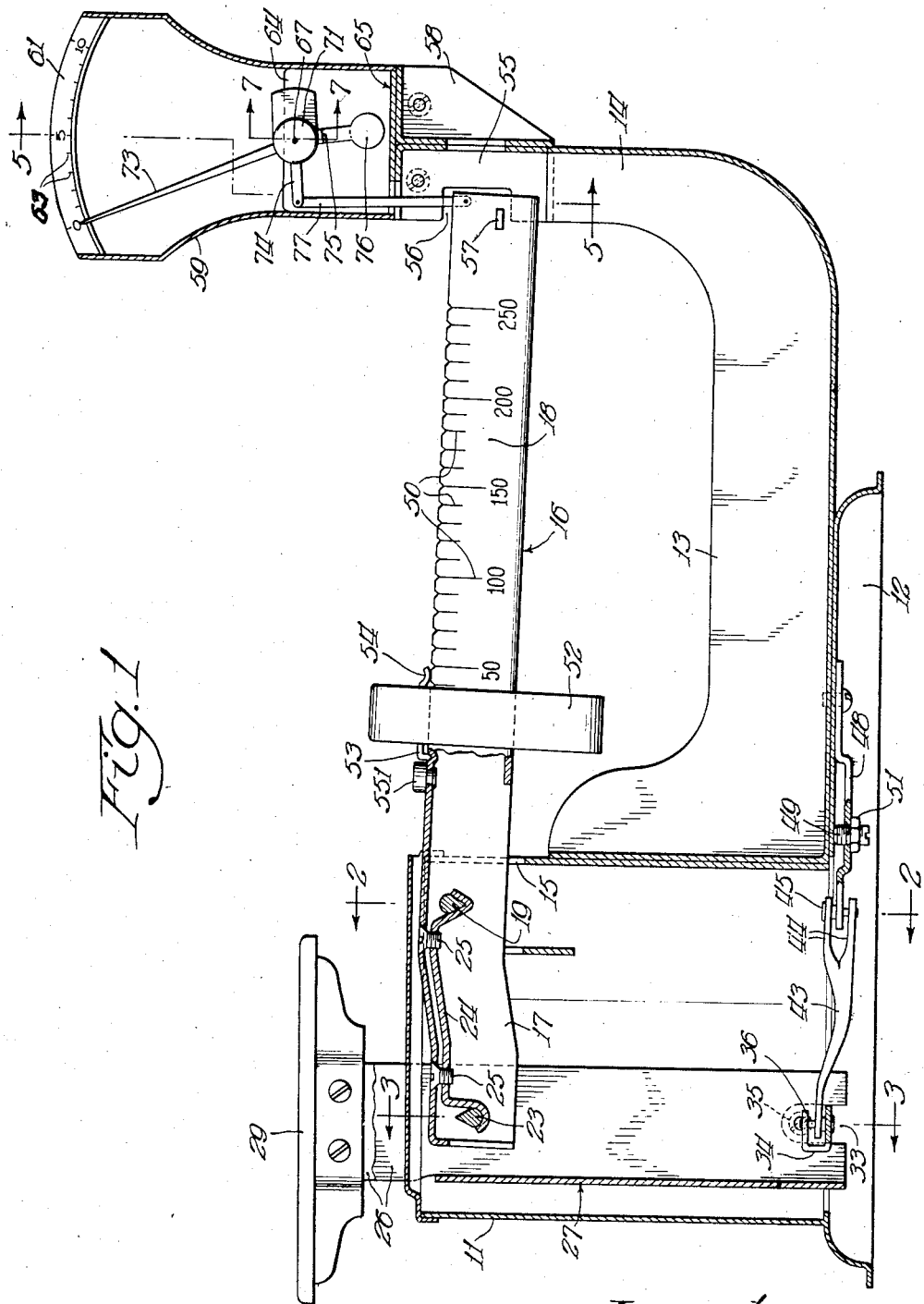

Jan. 3, 1939.  J. M. TRINER  2,142,424
SCALE
Filed Feb. 25, 1937  3 Sheets-Sheet 3
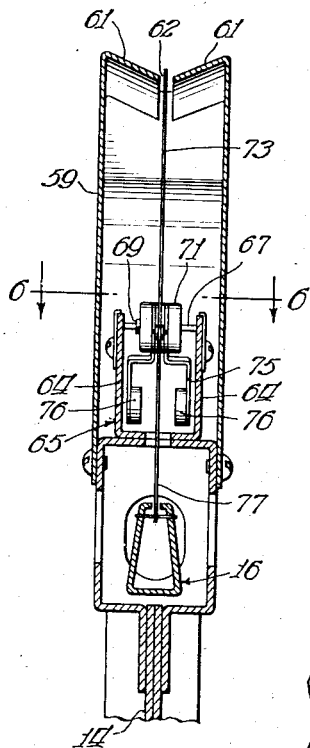
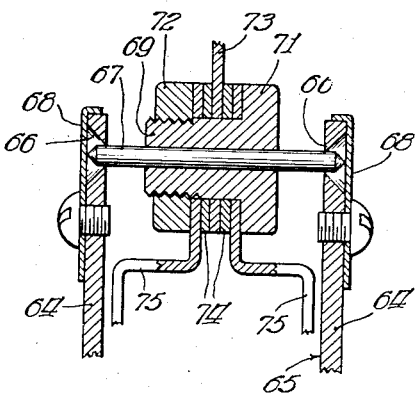
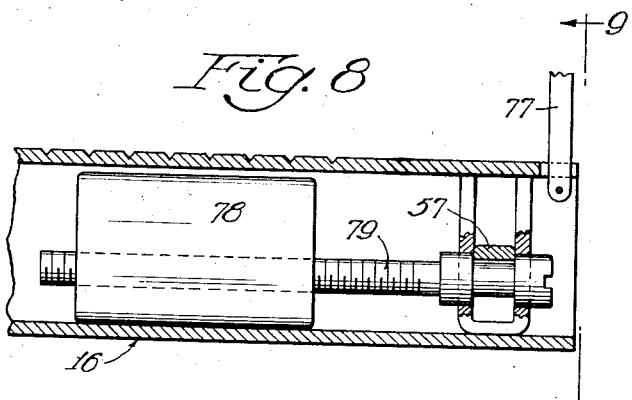
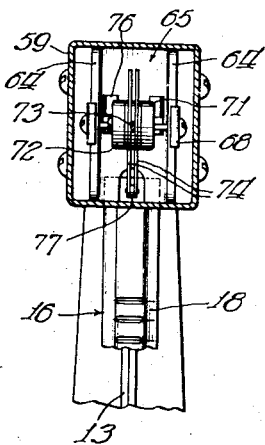
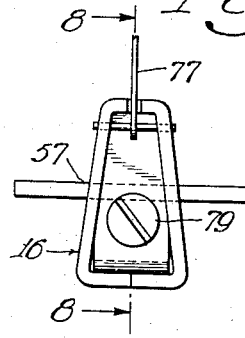
Inventor:
James M. Triner
By: Walter M. Fuller Atty.

Patented Jan. 3, 1939

2,142,424

UNITED STATES PATENT OFFICE 2,142,424

SCALE

James M. Triner, Chicago, Ill., assignor to Triner Scale & Manufacturing Company, Chicago, Ill., a corporation of Illinois Application February 25, 1937, Serial No. 127,603

7 Claims. (Cl. 265—58)

The present invention pertains to weighing scales and relates more especially to those designed and adapted to indicate small differences in weights, such for example, as grams.

One leading aim of the invention is the provision of a scale of sturdy design and structure possessing a marked degree of sensitivity and delicacy of action.

Another purpose of the invention resides in supplying a new style and type of stabilizing link which reduces friction to a minimum, which is self-centering, and which eliminates any error due to shift or change of position of the load on the weighing plate or platform, these structural features cooperating to assure the required accuracy and precision of operation with the needed sensitive properties.

The novel features relate more particularly, but not necessarily exclusively, to a scale having a main weighing-beam and a supplemental or auxiliary weighing means to indicate differences in weight of less amounts than can be determined by the main beam.

To the accomplishment of these and other objects, a present preferred embodiment of the invention has been designed and illustrated in the accompanying drawings throughout the several views of which like reference characters have been employed to designate the same parts.

In these drawings:

Figure 1 is a central, longitudinal, vertical section through one of the new types of scales;

Figure 2 is a vertical cross-section on line 2—2 of Figure 1;

Figure 3 is also a vertical cross-section on line 3—3 of Figure 1;

Figure 4 is an enlarged, fragmentary, vertical section through the novel, circular, knife-edge bearings for the stabilizing-link on line 4—4 of Figure 2;

Figure 5 is a vertical cross-section on the staggered line 5—5 of Figure 1;

Figure 6 is a horizontal section on line 6—6 of Figure 5;

Figure 7 is a considerably-enlarged, vertical section on line 7—7 of Figure 1;

Figure 8 is a fragmentary, vertical, lengthwise section on a large scale through the end portion of the weighing-beam on line 8—8 of Figure 9; and Figure 9 is an end view of such weighing-beam.

Referring to these drawings, it will be readily perceived that the improved scale includes a main sheet-metal housing or casing of the shape or form depicted and designated 11 having an extended, hollow foot 12, an arm 13 being secured thereto in any approved manner, as by welding or otherwise, and having an upright, terminal portion 14.

Such casing has an aperture 15 in its wall above the arm 13 accommodating a sheet-metal weighing-beam or lever, characterized as a whole 16, whose portion 17 within the casing is shaped substantially-square in cross-section with its bottom wall missing, whereas the graduated part 18 of the beam is closed and of tapered form, as presented in Figure 9.

Inside of casing 11, such beam has its depending, spaced side-walls apertured in register to conform substantially exactly to the gross-section of a knife-edge bar 19 through which the latter extends, as shown in Figures 1 and 2, the sharp edge of the bar being arranged downwardly and resting and oscillatory on a pair of bearing-blocks 21, 21 mounted fixedly in the casing in any suitable manner outside of the opposite side-walls of the beam.

As portrayed in Figure 2, the opposite ends of such knife-edge bar 19 are bevelled downwardly outwardly to provide anti-friction end points contacting with the bearing-plates 22, 22 mounted on the inner surfaces of opposite walls of the casing.

As illustrated in Figures 1 and 3, near its end in the casing the beam is similarly fitted with a somewhat-longer knife-edge bar 23 whose sharp edge is presented upwardly, these two bars 19 and 23 being fastened fixedly and immovably in the beam, yet capable of replacement or adjustment, by a suitably-shaped clamp 24 formed to fit around the lower parts of the bars and held pressed against them by means of screws 25, 25 which adjustably fasten the clamp to the top wall of the beam (Figure 1).

The protruding, bevelled, end portions of bar 23 extend through aligned apertures in the upper parallel parts of the downwardly-converging side-walls 26, 26 of a hollow, sheet-metal stem or standard 27 which project up through holes 28, 28 in the top wall of the casing, such side-walls at their tops carrying a weight-receiving plate or platform 29.

Such apertures in the side-walls 26, 26 are fitted with the usual bearing-blocks 31, 31 resting on the top sharp edge of the bar 23 and the end points of the latter contact plates 32, 32 secured to the outer surfaces of the specified side-walls.

Thus the scale has proper knife-edge and anti-friction bearings for the imposition of the load on the beam and for the beam itself.

Referring to Figures 1 to 4 inclusive, it will be perceived that each side-wall 26 is recessed at 33 at its lower end and these aligned or registering recesses (Figure 3) receive a bent plate 34 whose ends extend up outside of the side-walls 26, 26 to which they are fixed by screws 35, 35, the central portion of the plate 34 having a part 36 bent up therefrom and then over parallel to, but spaced upwardly from, the plate (Figures 3 and 4).

A short vertical rod or stationary shaft, designated as a whole 37 and having a larger cylindrical part 38 and a smaller slightly-tapered part 39 with an intervening conical bearing portion 41, is fixedly mounted in aligned holes in the members 34, 36, it being noted that the conical part 41 which is located in the space between such members flares or enlarges downwardly in order to form one element of a circular, knife-edge bearing, the companion element of which is the circular knife-edge at the lower margin of a tapered hole 42 through one terminal portion of a stabilizing-link 43 whose opposite end is bifurcated at 44 to supply two vertically-separated parts in which is mounted another short rod or shaft 45 like the part 37 except that its intermediate conical section 46 flares or enlarges upwardly.

This conical part 46 rests on the round or circular knife-edge at the upper margin of a flaring or conical hole 47 through an end of an adjustable, supporting, bent or offset bar 48 (Figures 1 and 4) mounted as by one or more screws 49 on the underside of the top-wall of the foot 12.

In order to provide for minor vertical adjustment of such bar and its circular knife-edge, the bar has a screw-threaded hole therethrough in which is a screw 49 bearing against the under surface of such foot top-wall and having a lock-nut 51 for maintenance of the desired adjustment.

By turning screw 49, the precise vertical position of the knife-edge bearing of the link may be obtained and this is of material importance in securing the required accuracy of the weight reading of the graduated device incorporated in the mechanism supplementary to the bar 18 and described in detail below.

As will be readily understood, the distance between the bearings 19—21 and 23—31 is the same as that between the two, circular, knife-edge bearings at the opposite ends of the link 43, the latter bearings being directly below the specified upper bearings.

The vertical adjustment or slight flexure of the member 48 by its screw 49 is provided so that the vertical distance between the knife-edge link-bearing adjacent the member 48 and the bearing 19—21 directly above it may be made equal to the distance between the other knife-edge link-bearing and the bearing 23—31 straight above it, in order to secure and maintain the needed exact parallel motion movement of the parts to obtain the precise weighing function of the mechanism.

It will be noted also that the two circular, knife-edge bearings are each self-centering by reason of their conical members.

As presented in Figure 1, the long, protruding, accessible portion of the scale-beam 18 is notched on its top edge to retain its adjustable weight 52 in any desired position by its detent 53 entering and being temporarily retained in the corresponding notch, the weight also having a rider 54 bearing and slidable on the upper edge of the beam, travel of the weight to the left beyond its 0 position being prevented by a stop 55¹ on the beam.

The distance between any two, adjacent, beam notches corresponds to ten units of weight, for example, ten grams, so that by the use of the beam and its associated weight no finer or closer weighing than ten units would be available, other auxiliary means, shortly to be described, permitting weighing down to individual units or single grams.

As is shown in Figure 1, the side of the beam has a graduated scale 50 corresponding to the notches, and, in the present instance, such scale reads "0—50—100—150—200—250" with no units between the specified amounts.

A sheet-metal shell 55, open toward the beam and receiving inside of it the extreme end-portion of the beam, is mounted on the top of the upright portion 14 of the arm 13, the side-walls of such shell being recessed at 56 for the accommodation of the terminal parts of a stop cross-bar 57 extended through the beam 18 and by coaction with the bottom margins of the recesses limiting the descent of the beam, its ascent being restricted by its direct contact with the top-wall of such shell.

Above the shell 55 and a bracket 58 secured to the outer face thereof, and mounted on the two, is an upwardly-enlarging housing or hollow tower 59, whose top-wall comprises two, opposed, curved, inwardly-sloping flanges 61, 61 (Figure 5) with a slot or space 62 between their proximate edges, either one or both of their upper inclined surfaces having unit scale graduations 0 to 10 inclusive and designated by the reference numeral 63.

The upstanding, parallel arms 64, 64 of a bracket 65 fixed in the bottom of the housing or tower 59 have aligned, circular knife-edge bearings 66, 66 accommodating a shaft 67 with pointed, anti-friction ends in contact with plates 68, 68 secured to the outer faces of such arms, whereby a minimum of friction exists with relation to the turning of the shaft on which at its center is fixedly mounted a sleeve 69 having a head 71 at one end and externally screw-threaded at its other end which has a confining nut 72 firmly fastening between itself and the head of the shaft; (a) a central hand, pointer or needle 73 extending up and slightly through the slot 62 where its end cooperates with the graduations of scale 63, the parts of the tower or casing above the end of the hand protecting it from injury; (b) the inner ends of a double-arm 74 the two parts of which are located on opposite sides of and bear against the hub portion of the hand or index 73; and (c) two, depending, bent, pendulum arms 75, 75 carrying weights 76, 76 at their lower ends; these arms being outside of the duplex-arm 74 and in sidewise bearing contact therewith, whereby all of these members on the shaft act as a single element.

As is indicated in Figure 1, the outer end of the duplex-arm 74 is connected by a link 77 to the adjacent end of the weighing-beam 16—18, the link extending up through apertures in the top wall of shell 55 and in the floor of the housing or tower 59, and, by this means, the movements of the weighing-beam are transmitted to the index or hand 73 and to the companion pendulums 75, 76.

In order to have all of the minor, unavoidable slack in the interconnected parts, unescapably incident to any appliance of this character, taken up when the pointer 73 registers 0 on the scale 63, the center-of-gravity of the pendulums is slightly at that side of the bottom dead-center which tends to move the pointer to the right as viewed in Figure 1, thus assuring great accuracy of readings on scale 63, especially when small loads are imposed on the plate or platform 29.

As is shown in Figure 8, the weighing-beam or lever 16 is internally-supplied with a balancing weight 78 movable lengthwise the beam by a screw 79 to properly balance the associated and cooperating parts of the mechanism, and, of course, when thus equalized, the pointer 73 must be at its 0 position and the pendulums must occupy the predetermined or desired slightly off-set position referred to, and these may be secured by adjusting the pointer and the pendulum arms angularly around the sleeve 69 after first backing off the nut 72 and then tightening it again after the required location of the stated elements has been secured.

The manner of operating the new scale will doubtless be apparent, it being obvious that, when an unknown load is placed on the platform or plate 29, the part 18 of the beam 16 will rock upwardly, whereupon the weight 52 is shifted to the right until its position corresponds to the multiple-unit notch and scale graduation 50 just less than that of the load, and then the pointer will automatically rock to the right until the pendulums by their new positions just balance the excess of the load weight above that shown on the scale 50.

Stated otherwise, assuming that the unsolved weight of the load positioned on the platform is 124 grams, the member 52 is shifted along the beam until it is found that 130 grams is too great and 120 grams is too little, whereupon the weight 52 is positioned at 120 grams and upon inspecting the position of the hand or index 73, it will be found that it is opposite the scale graduation "4", the addition of the two—120 plus 4 being the actual weight of the load.

If the load is less than 10 grams, its weight will be at once automatically shown on scale 63 without moving the balancing element 52.

This invention as presented in the appended claims is not necessarily limited and restricted to the precise and exact details of structure shown and described because the invention is susceptible of a variety of embodiments and various changes in the particular scale shown may be resorted to without departure from the heart and essence of the invention and without the loss or sacrifice of any of its material benefits and advantages.

I claim:

1. In a scale, the combination of a support, a weighing-beam fulcrumed on said support, a plate adapted to support the load to be weighed, means connecting said plate to said beam to rock the latter, a counterbalancing-weight adjustable along said beam, multiple-unit weight-graduations with which said counterbalancing-weight cooperates, a rockably-mounted index, means operatively connecting said weighing-beam to said index, unit weight-graduations with which said index cooperates, whereby any units of load-balancing weight between any two successive multiple-unit graduations will be automatically indicated by said index, a pendulum fixed relatively to and rockable with said index restraining movement of said index, the center-of-gravity of said pendulum being slightly at one side of its lower dead-center when said index is in register with the 0 of said unit graduations, whereby the initial tendency of the pendulum to descend to low dead-center takes up the slack in the connections to said index thereby affording maximum accuracy of said index.

2. In a scale, the combination of a support, a weighing-beam fulcrumed on said support, a plate adapted to receive the load to be weighed, an upright stem carrying said plate and rockingly connected to said beam, a supporting-member, a substantially-horizontal stabilizing link, a self-centering round knife-edge connection between said stem and said link and directly below said rocking connection between said stem and said beam, a second self-centering round knife-edge connection between said link and said member and directly below said beam-fulcrum, each said self-centering connection including a substantially-vertical shaft having a conical section and a round knife-edge bearing thereon, a counterbalancing-weight adjustable along said beam, multiple-unit weight-graduations with which said counterbalancing-weight cooperates, a rockably-mounted index, means operatively connecting said weighing-beam to said index, unit weight-graduations with which said index cooperates, whereby any units of load-balancing weight between any two successive multiple-unit graduations will be automatically indicated by said index, a pendulum fixed relatively to and rockable with said index restraining movement of said index, the center-of-gravity of said pendulum being slightly at one side of its lower dead-center when said index is in register with the 0 of said unit-graduations, whereby the initial tendency of the pendulum to descend to lower dead-center takes up the slack in the connections to said index thereby affording maximum accuracy of said index.

3. In a scale, the combination of a support, a weighing beam fulcrumed on said support, a plate adapted to receive the load to be weighed, an upright stem carrying said plate and rockably connected to said beam, a supporting member, a substantially-horizontal stabilizing-link, a self-centering round knife-edge connection between said stem and said link and directly below said rocking connection between said stem and said beam, a second self-centering round knife-edge connection between said link and said member and directly below said beam-fulcrum, each of said self-centering connections including a substantially-vertical shaft having a conical section and a round knife-edge bearing thereon, a counterbalancing-weight adjustable along said beam, multiple-unit weight graduations with which said counterweight cooperates, a rockably-mounted index, means restraining movement of said index, means operatively connecting said weighing means to said index, unit weight-graduation with which said index cooperates, whereby any units of load-balancing weight between any two successive multiple-unit graduations will be indicated by said index, and a stationary hollow tower accommodating said index and having a slotted top wall displaying said unit weight-graduations on its upper surface along said slot, said index extending into and movable in said slot.

4. The structure presented in claim 3 in which the portions of said tower top-wall on opposite sides of said slot slope downwardly inwardly to said slot, the outer upper portions of said top wall being at a level above said index and protecting said index against injury.

5. In a scale, the combination of a hollow weighing-beam having apertured side-walls accommodating a knife-edge bar with its edge disposed downwardly and another knife-edge bar with its edge disposed upwardly, a clamp engaging both of said bars, screw means securing said clamp to said beam, thereby holding said bars firmly in position but with capacity for adjustment or replacement, an anti-friction fulcrum for said beam including said knife-edge bar having its edge disposed downwardly, means to impose the load to be weighed on said beam through an anti-friction bearing including said knife-edge bar having its edge disposed upwardly, and means to balance said load including a weight adjustable along said beam.

6. In a scale, the combination of a support, a weighing-beam fulcrumed on said support, a plate adapted to receive the load to be weighed, an upright stem carrying said plate and rockingly connected to said beam, a supporting-member, a stabilizing-link, a self-centering connection having a round knife-edge bearing between said stem and said link and directly below said rocking connection between said stem and said beam, a second self-centering connection having a round knife-edge bearing between said link and said member and directly below said beam-fulcrum, each said self-centering connection including a substantially-vertical shaft having a conical section on which the round knife-edge bears, and means to balance the load on said plate including a weight adjustable along said beam.

7. The scale set forth in claim 6 in which said supporting-member is flexible at least in part, in combination with means fastening one portion of said member to said support, and screw-threaded means cooperating with said flexible portion of said member and said support allowing flexure of said member to secure vertical adjustment of said self-centering connection of said support with said link.

JAMES M. TRINER.